United States Patent [19]

Palazzetti et al.

[11] 4,291,834
[45] Sep. 29, 1981

[54] SYSTEM FOR HEATING AIR

[75] Inventors: Mario Palazzetti, Avigliana; Giorgio Becchi, Turin; Guiseppe Cane, Sangano all of Italy

[73] Assignee: Centro Ricerche Fiat S.p.A., Orbassano, Italy

[21] Appl. No.: 81,585

[22] Filed: Oct. 3, 1979

[30] Foreign Application Priority Data

Oct. 5, 1978 [IT] Italy ............................ 69306 A/78

[51] Int. Cl.³ .................................................. F24D 5/00
[52] U.S. Cl. ............................ 237/12.1; 237/12.3 A; 165/DIG. 2; 60/689
[58] Field of Search ................. 237/12.1, 12.3 A, 30, 237/50, 55; 165/DIG. 2; 126/101; 60/689

[56] References Cited

U.S. PATENT DOCUMENTS 1,323,889 12/1919 Mabee .............................. 237/50
2,076,382 4/1937 Minton ........................ 237/12.1 X
2,273,502 2/1942 Couse ............................ 237/12.1

Primary Examiner—Albert J. Makay
Assistant Examiner—Henry Bennett
Attorney, Agent, or Firm—Sughrue, Mion, Zinn, Macpeak & Seas

[57] ABSTRACT

An air heating system comprises a duct housing an air-cooled internal combustion engine which drives a fan to cause air to be drawn in through an inlet mouth of the duct and blown through the duct to a utilizer. The exhaust gases from the engine are fed as heating fluid to a heat exchanger through which they pass in a helical path concentric with the axis of the duct. Preheating of the air drawn into the duct can be achieved by providing a second heat exchanger through which air must flow before entering the duct inlet. The heating fluid for the second heat exchanger comprises a mixture of the used air from the utilizer and the exhaust gases leaving the main heat exchanger in the duct.

6 Claims, 2 Drawing Figures

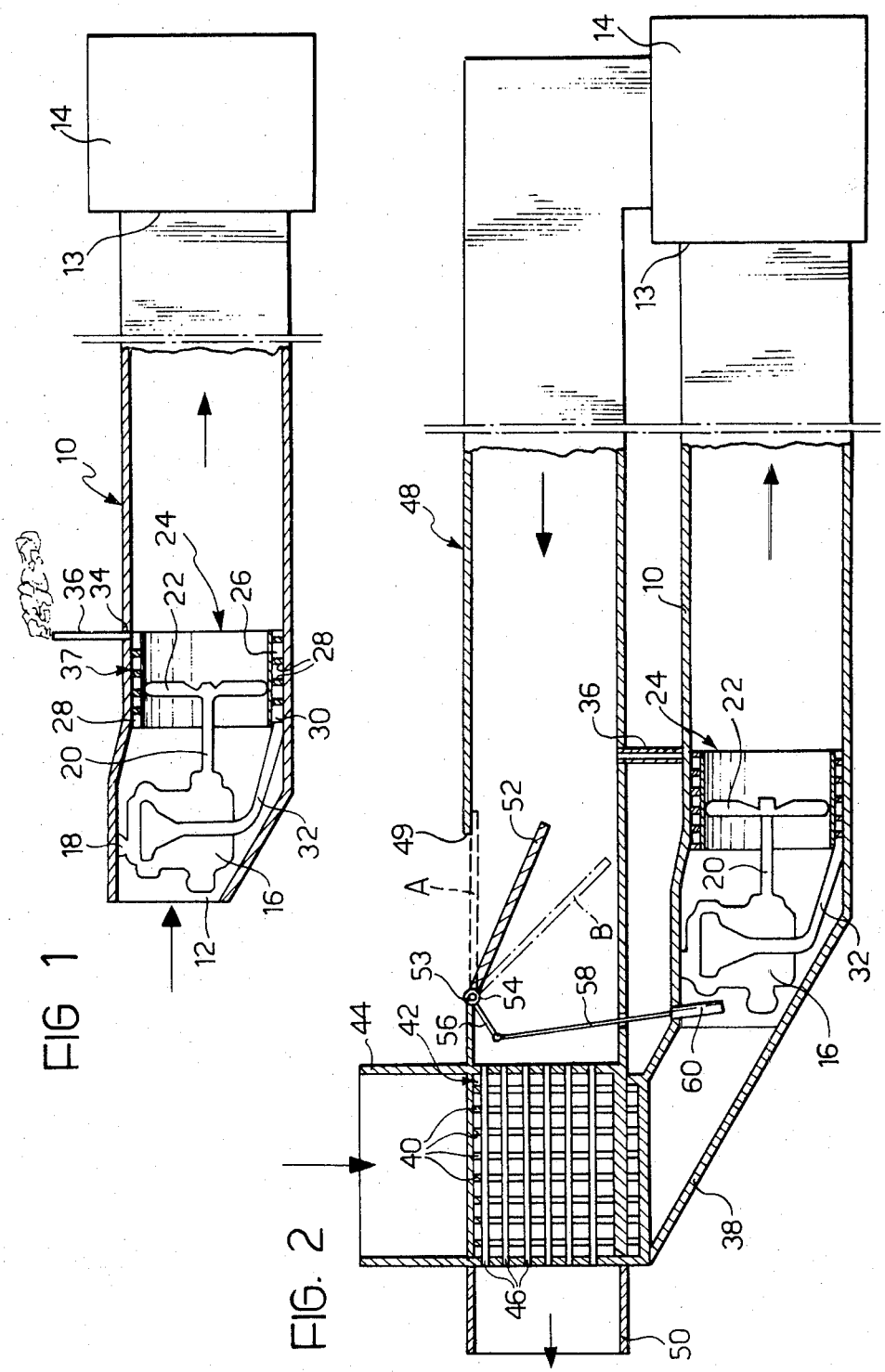

SYSTEM FOR HEATING AIR

The present invention relates to a system for heating air, and in particular to an air heating system comprising an air duct having an inlet open to the atmosphere and an outlet from which air can be directed to a utiliser. Within the duct there are located heating means, and an axial flow fan. In use air is drawn in through the inlet, heated within the duct and then conveyed towards the outlet of the duct from where it is directed to a utiliser.

The present invention aims to provide an air heating system of the general type described above which is able to operate to provide a high thermal yield at a low operating cost whilst requiring only simple maintenance.

According to the present invention, there is provided a system for heating air, comprising an air conveyor duct having an inlet mouth open to the atmosphere and an outlet, means for heating air within the duct, and means for causing axial flow of air through the duct for drawing external air in through the inlet mouth and for conveying the heated air towards the outlet of the said duct, in which the means for heating the air comprise an air-cooled internal combustion engine mounted within the duct and operable to drive the said means for causing axial flow of air within the duct, and a heat exchanger utilising, as heating fluid for the air to be heated, the exhaust gases produced by the said internal combustion engine; the said heat exchanger also being housed within the duct downstream of the said internal combustion engine with respect to the direction of flow of the air to be heated.

The system of the present invention permits the recovery of a substantial part of the heat energy dissipated by the internal combustion engine, both by means of the direct heat exchange between the motor itself and the air to be heated which flows over the engine within the duct, and also by means of the indirect heat exchange between the air and the exhaust gases from the engine which takes place at the heat exchanger.

Two embodiments of the present invention will now be more particularly described, by way of example, with reference to the accompanying drawings, in which:

FIG. 1 is a schematic view in longitudinal section of one embodiment of the system according to the invention; and FIG. 2 is a similar longitudinal section of a second embodiment.

With reference first to FIG. 1, the air heating system comprises a duct 10 formed at one end with an inlet mouth 12 communicating with the atmosphere. The duct 10 has at its opposite end an outlet 13 leading to a utiliser schematically represented by the block 14. The utiliser 14 may be of any type. It may be constituted, for example, by a region or space to be heated or it may be the interior of a drying apparatus or machine.

Within the duct 10, immediately downstream from the inlet mouth 12, is mounted an air-cooled internal combustion engine 16. The internal combustion engine 16 may be supported within the duct 10 in any known way, for example it may be supported by means of resilient suspension members, one of which is schematically indicated at 18 in FIG 1. The internal combustion engine 16 has a drive shaft 20 which carries a fan 22 comprising a plurality of radial blades. The fan 22 is located coaxially within the duct 10 downstream from the engine 16 so that, during operation of the engine, the fan draws external air in through the inlet mouth 12 and drives it through the duct to the utiliser 14.

Adjacent to a section of the inner wall of the duct 10 and surrounding the fan 22 is located a heat exchanger 24 constituted by a tubular element 26 coaxial with the duct 10 and forming with the immediately surrounding portion of the inner wall of the duct 10 a closed annular interspace 28. The annular interspace 28 has respective openings 30, 34 at each end, communicating respectively one with an exhaust pipe 32 leading from the engine, for conveying exhaust gases produced by the internal combustion engine 16 to the heat exchanger, and the other with a discharge tube 36 serving to convey the exhaust gases out from the heat exchanger to the exterior of the duct 10. Within the annular interspace 28 there is housed an helical diaphragm 37 which extends throughout the region lying between the two end openings 30, 34 and is coaxial with the duct 10.

In use of the air heating system the internal combustion engine 16 is run and drives the fan 22 to rotate; this causes external air to be drawn in through the inlet mouth 12 and to flow axially through the duct towards the outlet 13. The air within the duct 10 is subjected to a preliminary heating effect by flowing over the air-cooled internal combustion engine 16 which gives up a certain amount of heat in this way. Subsequently the temperature of the air within the duct 10 is further increased by the effect of the indirect heat exchange with the combustion gases of the engine 16 through the heat exchanger 24. The helical diaphragm 37 lodged in the interspace 28 directs the exhaust gases within the interior of the heat exchanger to flow helically around the heat exchanger so that the gases remain in the heat exchanger for a relatively long time, giving up their heat to the air flowing past driven by the fan. Moreover, the fan 22 causes a vortex flow of the air driven thereby, thus increasing the efficiency of the heat exchange at the heat exchanger 24.

The exhaust gases from the engine 16 at the outlet of the heat exchanger 24 are discharged into the atmosphere through the discharge tube 36, whilst the heated air is passed to the utiliser 14 from which, subsequently, it is discharged to the atmosphere.

The second embodiment illustrated in FIG. 2, differs from the embodiment previously described by the fact that the used air discharged from the utiliser 14 is utilised again, before being discharged to the atmosphere, to effect a pre-heating action on the air being drawn into the duct 10, upstream of the internal combustion engine 16. In the following description there will be described in detail only the differences between this embodiment and the previously described embodiment, utilising the same reference numerals for identical or similar parts.

With reference to FIG. 2, the duct 10, has, upstream of the internal combustion engine 16, a tubular extension 38 which communicates with a set of tubes 40 forming part of a tubular heat exchanger 42: the tubes 40 open into an air intake mouth 44. The tubular heat exchanger 42 is provided with a second set of tubes 46, adjacent and orthogonal to the tubes 40. The tubes 46 communicate at one end with a discharge duct 48 which carries the used air discharged from the utiliser 14, and open at the opposite end into a discharge mouth 50 which is open to the atmosphere. Upstream of the heat exchanger 42 (with respect to the flow of used air indicated by the arrows in the drawings) the discharge tube 36 which conveys the exhaust gases from the heat exchanger 24 leads into the interior of the discharge duct 48.

The discharge duct 48 is also provided, immediately upstream of the tubular heat exchanger 42, with a discharge opening 49 controlled by a distributor valve 52 movable within the discharge duct 48. The distributor valve 52 is connected, along one edge, to pivot pin 53 rotatable in a bush 54, supported, within the discharge duct 48, close to that edge of the opening 49 nearest the tubular heat exchanger 42. The pivot pin 53 is connected to one end of a lever 56 which is articulated, at the opposite end, to one end of an axially displaceable control rod 58. The axial displacement of the rod 58 is controlled by a thermostatic actuator 60 of a type known per se, lodged within the duct 10 in the region between the tubular heat exchanger 42 and the internal combustion engine 16.

The displacement of the control rod 58 causes the rotation of the distributor valve 52 between an extreme raised position, indicated A in the drawing, in which the discharge opening 49 is completely closed, and an extreme lowered position, indicated B, in which the discharge opening 49 is open and the communication between the discharge duct 48 and the tubes 46 of the heat exchanger 42 is completely blocked.

In use, when the system is first started, external air is drawn through the inlet mouth 44, the tubes 40 of the heat exchanger 42 and the extension part 38 of the duct 10. This air is then heated in the manner previously described by the internal combustion engine 16 and by the annular heat exchanger 24, and fed to the utiliser 14. During this initial stage of operation the distributor valve 52 is located in the raised position A so that the used air discharged from the utiliser 14 is mixed with the exhaust gas from the engine 16 entering the duct 48 through the discharge tube 36 and passes through the tubes 46 of the tubular heat exchanger 42 from which the mixture is discharged to the atmosphere through the outlet 50. Because the temperature of the used air mixed with the exhaust gases is, in normal operating conditions, greater than the temperature of the external air, there occurs in the interior of the heat exchanger 42 a pre-heating of this external air which is then drawn into the duct 10.

There is an upper limit to the temperature which the pre-heated air leaving the tubular heat exchanger 42 can usefully attain, imposed by the necessity of ensuring adequate cooling of the air-cooled internal combustion engine 16. The maintenance of the correct temperature of the pre-heated air is ensured by the distributor valve 52 controlled by the thermostatic actuator 60 which is sensitive to the temperature of the air drawn into the interior of the duct 10 in the region immediately upstream of the internal combustion engine 16. In fact, when the temperature of the air passing the thermostatic actuator 60 reaches the above mentioned limit value, the distributor valve 52, controlled by the thermostatic actuator 60, is in its lowermost position (position B) in such a way as to prevent the passage of the mixture of used air and exhaust gases to the heat exchanger 42. In normal operating conditions when the incoming air temperature passing the thermostatic actuator 60 is less than the limit value mentioned above the valve 52 operates to divide the flow of this mixture proportionally through the discharge opening 49 and the heat exchanger 42.

In the lower limit position of the valve 52 (position B) the mixture is completely discharged into the atmosphere through the discharge opening 49, and the duct 10 receives external air which has not been pre-heated at all.

What is claimed is:

1. In a system for heating air, comprising:
   an air conveyor duct, having an inlet mouth open to the atmosphere at one end thereof and an outlet at the other end thereof;
   means for heating air within said duct; and
   means for causing axial flow of air through said duct whereby to draw external air in to said duct through said inlet mouth and convey said air through said duct to said outlet of the said duct;
   the improvement wherein said means for heating air within said duct comprise an air-cooled internal combustion engine mounted within said duct and connected to said means for causing axial flow of air within said duct whereby to drive said air flow causing means,
   said means for heating air within said duct further comprise heat exchanger means through which the exhaust gases produced by said internal combustion engine pass as heating fluid for the air to be heated, said heat exchanger being housed within said duct, downstream of said internal combustion engine with respect to the direction of flow of said air to be heated,
   a utilizer having an inlet connected to the outlet and said air conveyor duct and an outlet,
   a return duct connected to the outlet of the utilizer to receive used air therefrom;
   means for conveying said exhaust gases from said internal combustion engine into said return air duct after said exhaust gases have passed through said heat exchanger whereby to mix said exhaust gases with the used air coming from said utilizer,
   a second heat exchanger for pre-heating the air drawn into said air conveyor duct, said second heat exchanger being located upstream of said internal combustion engine, and
   means for directing said used air and exhaust gases as heating fluid through said second heat exchanger.

2. The system of claim 1, wherein said heat exchanger is formed to provide for said exhaust gases from said internal combustion engine a helical path coaxial with the axis of said duct.

3. The system of claim 2, wherein said heat exchanger comprises:
   a tubular element located within a section of said duct and forming with the internal wall of said duct an annular interspace;
   means defining two end openings in said annular interspace;
   an exhaust pipe leading from said internal combustion engine to said heat exchanger communicating with one said end opening;
   a discharge tube leading from said heat exhanger to the exterior of said duct communicating with the other said end opening; and
   a helical member coaxial with said duct housed within said interspace, in the region thereof between said two end openings.

4. The system of claim 3, wherein said means for causing an axial flow of air through said duct comprises a fan located within said annular heat exchanger.

5. The system of claim 1, wherein said used air duct has, upstream of said second heat exchanger, means defining a discharge opening leading to the atmosphere;

a valve controlling said discharge opening, said valve being movable between two end positions in one of which said discharge opening is closed and said mixture is directed only through said second heat exchanger and in the other of which said second heat exchanger is blocked and said mixture is discharged into the atmosphere; said valve in its intermediate positions dividing the flow of said mixture partly through said discharge opening and partly through said second heat exchanger.

6. The system of claim 5, wherein there are further provided control means for controlling the position of said valve, said control means being sensitive to the temperature of the air within said duct in the region thereof between said second heat exchanger and said internal combustion engine.

* * * * *